H. H. STEELE.
TYPE WRITING MACHINE.
APPLICATION FILED JAN. 11, 1909.
955,010.
Patented Apr. 12, 1910.
4 SHEETS—SHEET 4.
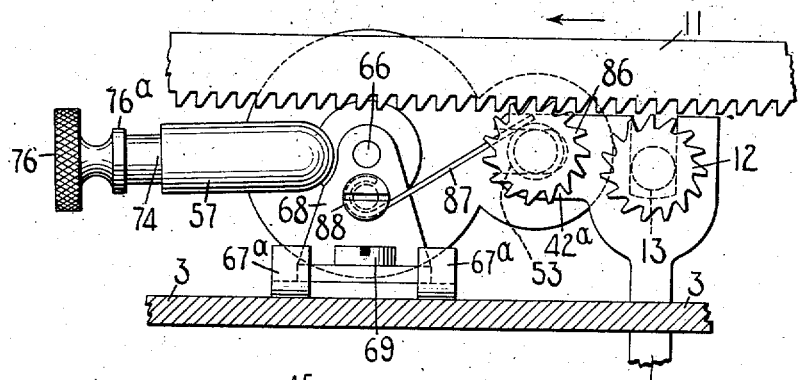
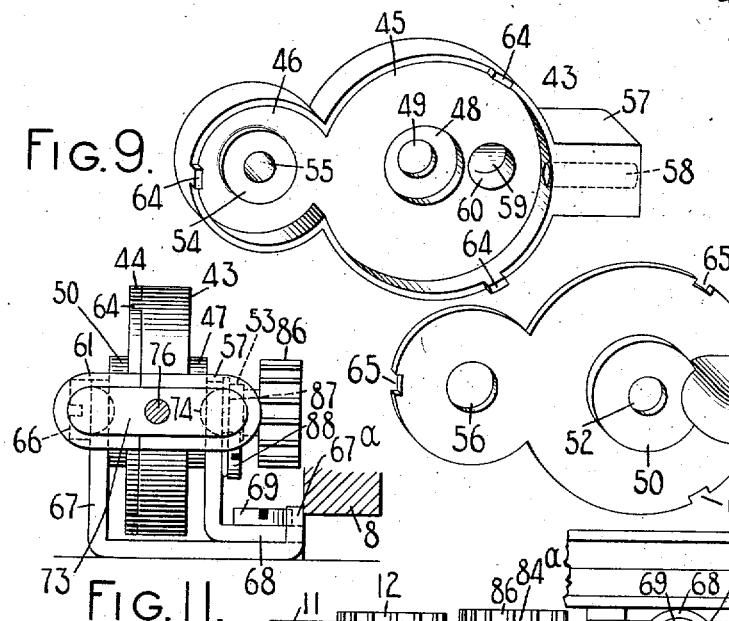
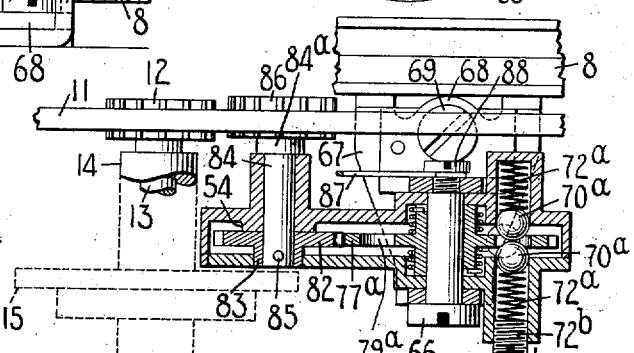
WITNESSES:
E. M. Wells.
M. W. Pool
INVENTOR:
Herbert H. Steele
By Jacob Felbel
HIS ATTORNEY

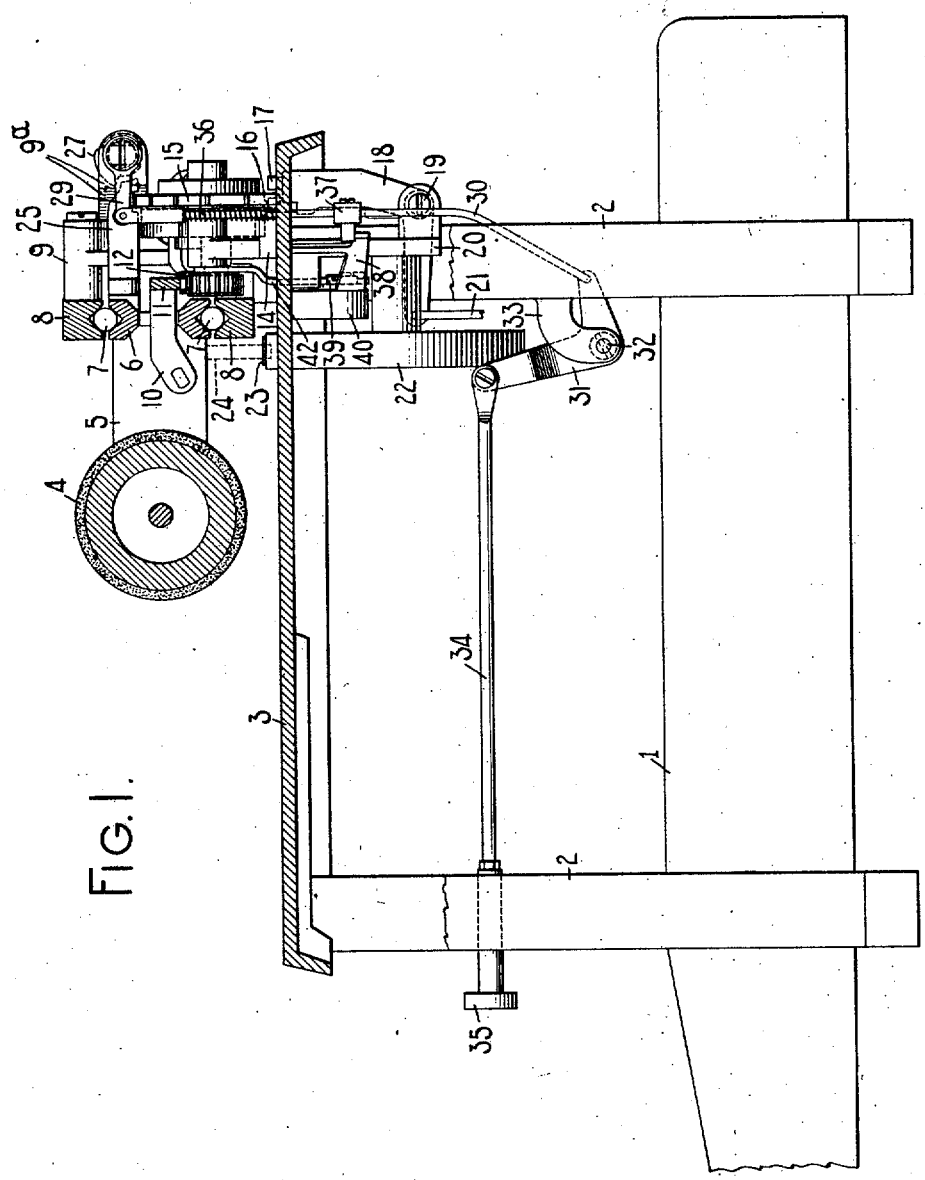

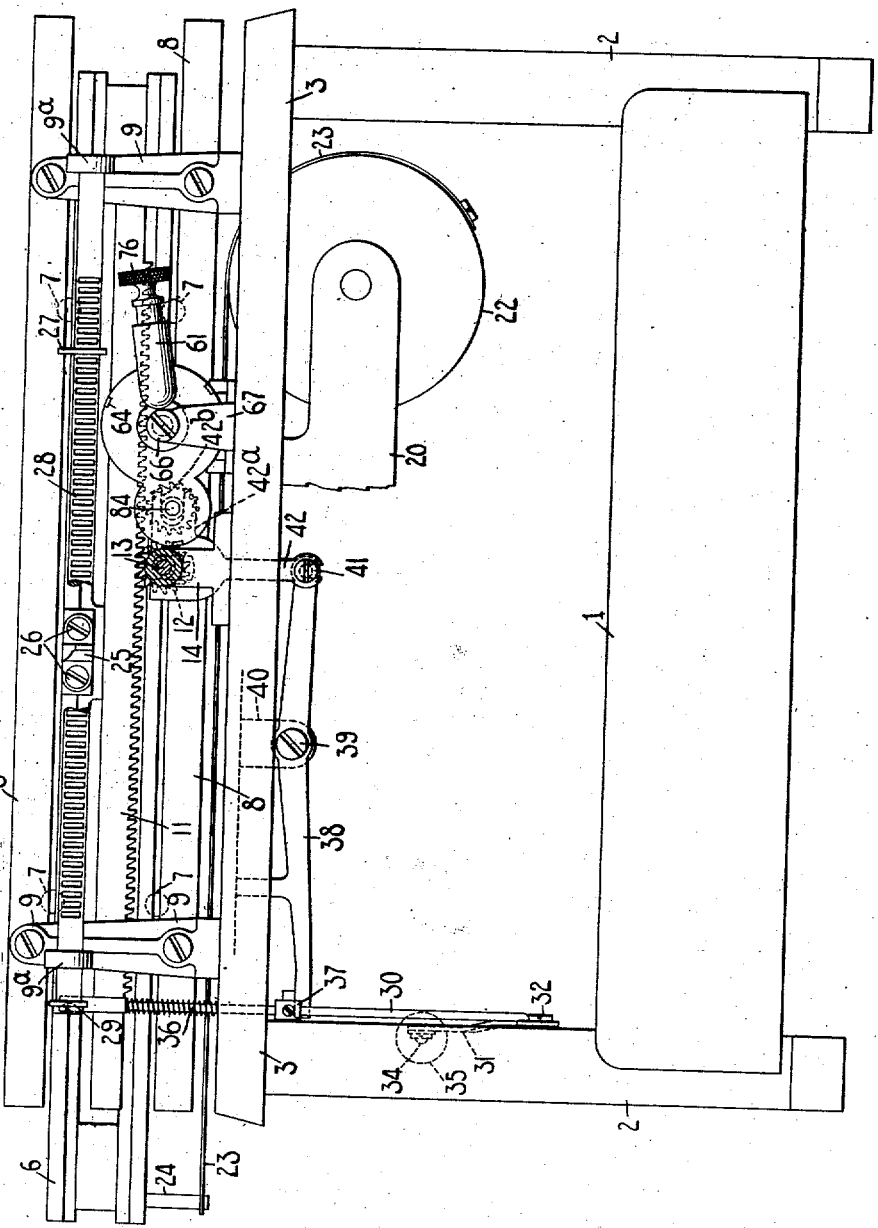

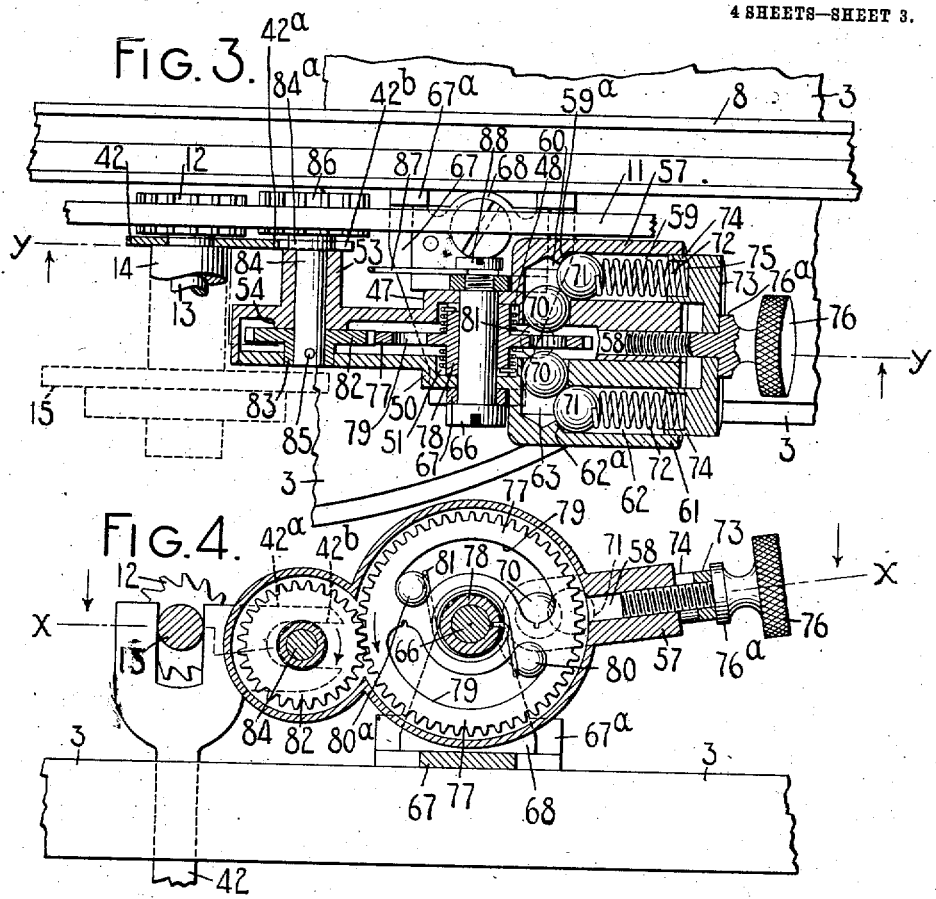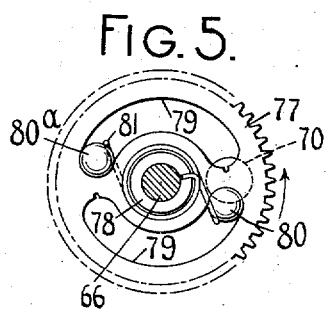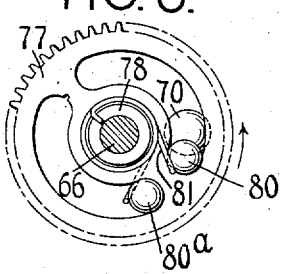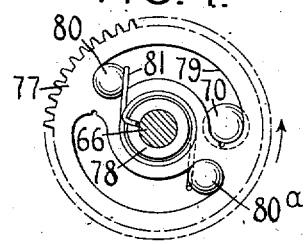

UNITED STATES PATENT OFFICE.

HERBERT H. STEELE, OF MARCELLUS, NEW YORK, ASSIGNOR TO THE MONARCH TYPEWRITER COMPANY, OF SYRACUSE, NEW YORK, A CORPORATION OF NEW YORK.

TYPE-WRITING MACHINE.

955,010.     Specification of Letters Patent.    Patented Apr. 12, 1910.

Application filed January 11, 1909. Serial No. 471,627.

*To all whom it may concern:*

Be it known that I, HERBERT H. STEELE, citizen of the United States, and resident of Marcellus, in the county of Onondaga and State of New York, have invented certain new and useful Improvements in Type-Writing Machines, of which the following is a specification.

My invention relates especially to retarding devices for typewriting machines and has for its main object to provide improved devices of the class specified.

To the above and other ends the invention consists in the features of construction, combinations of devices and arrangements of parts hereinafter described and particularly pointed out in the claims.

My invention is applicable to various forms of writing machines although I have illustrated said invention as embodied in a Monarch typewriting machine.

In the drawings, Figure 1 is a fragmentary side elevation partly in section of a Monarch typewriting machine embodying my invention. Fig. 2 is a fragmentary rear elevation of the machine. Fig. 3 is a view, partly in section taken on planes represented by the lines $x$—$x$ in Fig. 4, and looking directly downward as indicated by the arrows at said lines, said Fig. 3 showing the retarding devices mounted on the upper part of the machine. Fig. 4 is a vertical sectional view taken on planes represented by the line $y$—$y$ of Fig. 3. Figs. 5, 6 and 7 are operating views illustrating certain of the parts shown in Fig. 4 in different relations which said parts may occupy during a free run of the carriage. Fig. 8 is a front view showing the retarding devices and a section of the top plate on which they are supported, part of the carriage rack also being shown. Figs. 9 and 10 are perspective views each illustrating a part of the casing or box in which the main elements of the retarding devices are adapted to be contained. Fig. 11 is a side elevation partly in section of the retarding devices and their support. Fig. 12 is a view corresponding with Fig. 3 but illustrating a modification.

In various figures, parts of the machine are omitted and parts broken away.

Referring especially to Figs. 1 and 2 of the drawings, the main frame of the machine is shown as comprising a base 1, corner posts 2 and a top plate 3. The usual printing instrumentalities (not shown) are mounted on the main frame and the type bars when actuated are adapted to coöperate with the front face of a rotary platen 4 mounted in a carrier or carriage comprising end bars 5 and a rear bar or slide bar 6. The slide bar is grooved at its top and bottom faces to coöperate with anti-friction balls 7 which also coöperate with grooved guide rails 8 secured to standards 9 fixed to and rising from the top plate 3. Arms 10 pivoted on the carriage, support a feed rack 11 which normally meshes with a feed pinion 12 fixed to the front end of a horizontal shaft 13 which bears in a bracket 14 secured to the top plate. An escapement wheel 15 is supported at the rear end of the shaft 13 and coöperates with feed dogs 16 and 17 mounted at the top of a dog rocker 18, said dog rocker being pivoted at 19 to a bracket 20 depending from the top plate and being connected by a link 21 with a universal bar (not shown) operated by the key levers. A spring drum 22 is connected by a strap 23 with a pin 24 depending from the slide bar 6. Said spring drum, as is well-known, tends constantly to draw the carriage leftward over the top plate, the carriage movements in this direction, however, being ordinarily controlled by the operation of the escapement devices during the printing or spacing of the different characters in a line of writing.

The drawings illustrate tabulating mechanism which comprises a rearwardly projecting stop arm 25 secured by screws 26 at the rear of the slide bar 6. The stop 25 is adapted to coöperate with one or more tabulator stops 27 adjustably mounted on a toothed stop bar 28, said stop bar being journaled on arms 9ª projecting rearward from the standards 9. Normally the stops 27 are out of line with the stop 25 but the stop bar 28 is adapted to be turned in its bearings to bring said stops 27 in line with the stop 25 so that they may coöperate when the carriage is released. The means for so turning the stop bar 28 comprise an arm 29 secured near the right-hand end thereof and pivotally connected to a downwardly extending link 30, said link passing through an opening in the top plate and at its lower end being connected to one arm of a bell crank lever 31, said lever being pivoted at 32 on a fixed bracket or arm 33. The other arm of the bell crank lever 31 is pivotally connected with a slide rod 34 which extends forward and bears in an opening in the right-hand front corner post 2, said slide rod at its front end being provided with a tabulator key button or finger piece 35. A spring 36 coiled around the upper portion of the link 30 operates to maintain the stop bar 28 and its actuating devices in normal position. When the tabulator key 35 is pushed rearward it operates through the slide rod 34 and bell crank 31 to pull the link 30 downward and turn the stop bar 28 so as to bring the stops 27 thereon into line with the tabulator stop 25 on the carriage. Concurrently the carriage is released.

The releasing devices for the carriage operated by the tabulator key 25 comprise a finger 37 secured to the link 30 and coöperative with one arm of a lever 38 pivoted at 39 on a bracket 40 depending from the top plate. The other arm of the lever 38 is pivotally connected at 41 with a lifting device or member 42, said lifting device near its upper end being bifurcated to coöperate with cut-outs in the sides of the bracket 14. In the usual construction the bifurcations of the device 42 are provided with lifting shoes which are adapted to engage with the teeth of the rack 11 to sepgage it from the feed pinion 12 and thus release the carriage from its escapement devices. In the present case, however, I prefer to dispense with these lifting shoes and to provide the device 42 with a lateral off-set 42ª which is formed with a horizontal slot 42ᵇ, which slot coöperates with the retarding devices, operating the latter to cause the release of the carriage in a manner hereinafter described at length.

The retarding devices devised by me and about to be described make use of certain features of invention first disclosed in the patent to Felbel 898,635, granted September 19, 1908. Said patent relates to a retarding mechanism which embodies means for interrupting the motion of the carriage a plurality of times during a single run thereof from right to left when released from the control of the escapement devices. These recurrent interruptions operate to diminish the momentum of the carriage to such an extent that even after long runs said carriage will be arrested by the tabulator stops without undue shock or noise. The obstructing devices being relatively weaker than the pulling force applied to the carriage when it is released, the periodical or intermittent interruptions thereof will operate to momentarily slacken the speed of the carriage and absorb some of the force with which otherwise the carriage would finally strike; but will not effect a complete stoppage of the carriage, said complete stoppage taking place only when the tabulator stops are brought into engagement. It sometimes happens with a construction such as that disclosed in the said Felbel patent that when the carriage is released for a free run one of the intermittent retarding devices will be engaged by or will be about to be engaged by the coöperating retarding device so that at the start the carriage may move sluggishly and an unnecessary amount of time be consumed. My improved devices insure that the carriage after being released may always move freely for some distance prior to the beginning of the effective operation of the retarding mechanism.

The retarding devices are contained in a casing or holder, the two parts whereof are shown detached in Figs. 9 and 10. One part 43 is in the nature of a box and the other part 44 provides a cover therefor. The box or container 43 comprises two connecting circular chambers 45 and 46. The outside of the larger chamber 45 is provided with a central boss 47 opposite to which inside the chamber is a depression 48 having a central perforation 49 (Figs. 3 and 9). The cover plate 44 is formed with a corresponding boss 50, depression 51 and central opening 52. The smaller chamber 46 is provided with an outside elongated boss 53 and a lower or shorter inner boss 54. The bosses 53 and 54 are formed with a central perforation 55, the cover plate 44 being formed with a corresponding perforation 56. At the side of the larger chamber 45 opposite to the smaller chamber the box-like container 43 is provided with an enlargement 57 which is formed with a threaded hole 58 connected with the larger chamber and with two connecting holes or chambers 59 and 60 at right angles to each other. The cover plate 44 is provided with a corresponding enlargement 61 formed with connecting holes 62 and 63 at right angles to each other. The edge of the container 43 is provided with lugs 64 which are adapted to coöperate with corresponding notches 65 in the cover plate so as to prevent relative movement between the cover plate and the container when the two parts have been fitted together. The two parts 43 and 44 are adapted to be held together by a headed and shouldered screw 66, said screw passing through the bearing openings 52 and 49 and serving as a pivot on which the casing as a whole may be oscillated. The pivot screw 66 is supported in a bracket comprising two angled plates 67 and 68 (Figs. 3, 8 and 11). The upright bearing arms of the two plates are spaced apart and the plate 68 is seated on the plate 67, the two being secured together and to the top plate by a headed screw 69 behind the lower guide rail 8. The horizontal arm of the plate 67 is provided with up-turned fingers 67ª which contact with the rear vertical face of the lower guide rail and prevent the bracket as a whole from turning on the screw 69 as a pivot. The rear edge of the horizontal arm of the bracket arm 68 contacts with the upturned fingers 67ª so that relative turning movement between the angled plates 67 and 68 is also prevented. When the casing is mounted on a pivot screw 66 said casing is confined between the upright arms of the angled plates 67 and 68, the bosses 47 and 50 contacting with the inner faces of the upright arms and preventing the two parts of the casing from separating and also preventing movement of the casing as a whole longitudinally of the pivot screw 66.

Prior to the mounting of the casing on its support and while the two parts 43 and 44 are separate the devices contained in the two parts are assembled in place. A check or ball 70 is placed in the hole 60 and a corresponding check or ball 70 in the hole 63. Companion balls 71 are placed in the holes 59 and 62 and are held in contact with stop faces 59ª and 62ª projecting into said holes by coiled pressure springs 72 (Fig. 3). These pressure springs coöperate with an adjustable slide or abutment 73 provided with plug-like portions 74 which are adapted to fit into the holes 59 and 62. The plugs 74 are formed with depressions or seats 75 in which the ends of the springs 72 are received. A thumb screw 76 passes through an opening in the follower 73 and engages with the threaded opening 58 in the member 43. The thumb screw is provided with a shouldered portion 76ª which coöperates with the follower 73 to prevent movement of the follower endwise of the thumb screw and relative thereto. The construction is such that by turning the thumb screw in or out the pressure of the springs 72 will be regulated. It should be understood, however, that while the balls 70 and 71 and springs 72 may be fitted in place prior to the assembling of the container 43 and cover 44, the slide or follower 73 and thumb screw 76 are not arranged in place until after the cover 44 is in place on the container. Prior to the assembling of the follower 73 and thumb screw 76 a rotary member or gear wheel 77 (Figs. 3 and 4) is seated in the chamber 45. The gear wheel 77 is provided with oppositely disposed hub portions 78 having a central opening for the pivot screw 66, one of the hub portions being seated in the depression 48 and the other hub portion being adapted to be received in the depression 51 in the cover. The gear wheel is formed with two oppositely disposed arcuate slots 79 each of which receives a steel ball. These balls are duplicates but for convenience of reference will be given different numbers 80 and 80ª. The balls are prevented from falling out of the slots when the parts are assembled by the walls of the container and cover plate. Each ball is normally maintained in contact with one end of the associate slot by a wire spring 81 which is coiled around one of the hub portions 78, one end of each spring being secured in an opening in the hub and the other end extending into the associate slot 79 and being bent to engage with the ball 80 or 80ª. The gear wheel 77, it will be noted, is in the nature of a ball container. A smaller gear wheel 82 is arranged in the chamber 46, said gear wheel meshing with the gear wheel 77. The gear wheel 82 has a hub portion 83 which is perforated to receive a shaft 84 which bears in the opening 55 in the container. The hub 83 receives a pin 85 which secures the gear wheel 82 and shaft 84 in fixed relation. When the cover plate is assembled the hub 83 is adapted to bear in the hole 56 therein. The shaft 84 projects forward beyond the hub 83 and is enlarged as indicated at 84ª providing a shoulder which abuts against the end of the hub. The enlarged portion has fixed to it a toothed wheel 86 which is adapted to coöperate with the teeth of the rack 11.

After the various devices above described, including the gear wheels 82 and 77, the balls 80 and 80ª, 70 and 71, the springs 48 and 72 and the shaft 84 have been arranged in the container, the cover thereof is put on and the follower 73 and thumb screw 76 assembled. Then the entire casing and its contents are arranged between the uprights of the angled plates 67 and 68, after which the pivot screw 66 is screwed in place. In mounting the casing on the machine the enlarged portion 84ª of the shaft 84, where said enlarged portion is exposed between the toothed wheel 86 and the hub 53, is entered in the slot way 42ᵇ in the lifting member. The lifting member tends to maintain the retarding contrivance comprising the casing and its contents in the position shown in Fig. 4. Said contrivance is further provided with a restoring spring 87 which as best shown in Fig. 8 engages at its free end with the top of the hub 53, the opposite end of the spring 87 being secured by a headed screw 88 to the outer face of the angled plate 68.

Supposing the parts to be initially in the relationships shown in Fig. 4 in operation, the tabulator key is pushed in to position the tabulator stops and release the carriage, the lifting member 42 is raised and the slotted extension 42ª thereof, coöperating with the enlargement on the shaft 34, will turn the retarding contrivance on its pivot 66, raising the toothed wheel 86 into engagement with the teeth of the rack 11. As the upward movement of the wheel 86 continues the rack 11 will be lifted until it disengages from the feed pinion 12, thus freeing the carriage, which will immediately start to move leftward under the pull of the main spring contained in the drum 22. The free leftward movement of the carriage causes the toothed wheel 86 to turn the gear wheel 82 which turns the gear wheel 77 in the direction of the arrow in Fig. 4. If, as supposed, the parts start initially from the position illustrated in Fig. 4, the wheel 77 after it has turned a short distance will bring the ball 80 into contact with the retarding or check devices or balls 70. These balls, as will be best understood from a consideration of Fig. 3, may each have a slight bodily movement toward and away from the adjacent face of the wheel 77 in the respective chambers 60 and 63. This movement is limited in one direction by the adjacent face of the gear wheel and in the opposite direction by the companion ball 71. The ball 71 is under constant pressure from its spring 72 in a direction at right angles substantially to the direction of bodily movement of the ball 70. The balls 71 are held from movement toward the associate ball 70 by the projections or stops 59ª and 62ª. The balls 70, it will be noted, are loose so that they cannot impede the wheel 77 by contact with the wheel itself; but the balls 80 and 80ª carried by said wheel are of such diameter that they cannot pass between the balls 70 until the latter have been forced away from each other into contact with the associate balls 71, causing movement of said balls 71 and corresponding pressure of the springs 72. When, however, during the initial turning of the gear wheel 72, the ball 80 is first brought into contact with the balls 70, said balls 70 will not be forced apart for the reason that the springs 72 are stronger than the springs 81. Consequently after the ball 80 contacts with the balls 70 as shown in Fig. 5, said ball 80 will be held back by the balls 70 until the wheel 77 has turned from the position shown in Fig. 5 to that shown in Fig. 6. Comparing these two figures it will be seen that the wheel 77 has advanced, causing relative movement between the ball 80 and its slot 79 so that said ball in Fig. 6 is in contact with the end of the slot 79, opposite from that with which it is normally maintained in contact. This relative movement between the ball 80 and its slot causes a flexing of the associate spring 81 beyond the normal. After the opposite end of the slot 79 has advanced far enough to engage with the ball 80, however, as shown in Fig. 6, further turning movement of the wheel 78 in the direction of the arrow, will force the ball 80 upward and will press the balls 70 apart to permit of this upward movement of the ball 80 because the carriage main spring, of course, is stronger than the springs 72. Pressure of the springs 72 is regulated by the regulating devices 73 and 76 so as to cause a momentary checking of the speed of the carriage to an extent which is found most advantageous in practice. Up to this point, however, it will be understood, the carriage movement has been substantially free and uninterrupted. As soon as the ball 80 has been forced past the checking balls 70 the associate spring 81 will operate on the ball 80 to return it to its normal position against what may be termed the forward end of the associate slot 79. The parts at this time will be in the positions shown in Fig. 7. Considering said Fig. 7 it will be seen that the wheel 77, after a further comparatively slight advanced movement, will bring the ball 80ª into engagement with the check balls 70. Thereafter a further turning of the wheel will flex the spring 81, associated with the ball 80ª and the associate slot 79 will pass said ball 80ª until the opposite end of said slot engages with said ball and forces it past the check balls 70, causing another momentary checking of the carriage. As soon as the ball 80ª passes the check balls it will be forced back to normal position in its slot by the spring 81. If the run of the carriage is continued the operations above outlined may recur, thus affording an intermittent or periodic retardation of the carriage after a free initial run thereof.

When the carriage is arrested by the tabulator stops and the tabulator key is released, the various parts will be restored to normal position, the retarding contrivance returning to normal position under the influence of the member 42 and the restoring spring 87. When the retarding contrivance is disconnected from the carriage by the separation of the toothed wheel 86 from the rack 11 it may be that the checking balls 70 will not be in contact with either of the balls 80 or 80ª in which case there will be no relative movement among the various retarding devices comprised in the retarding contrivance after the contrivance is disconnected from the carriage. Examples of positions in which the check balls are inoperative are shown in Figs. 4 and 7. It may be, however, that at the time of disconnection of the retarding contrivance the check balls and one of the coöperating balls 80 or 80ª will be in engagement and the associate spring 81 may be flexed; say, for example, in some such relation as that shown in Fig. 6. In this event after the disconnection of the retarding contrivance the flexed spring 81 will operate to turn the gear wheel 77 backward, causing a corresponding backward movement of the intermeshing gear 82 and associate parts until the end of the slot 79, which normally contacts with the ball, reëngages with said ball, when the parts will come to a stop. From what has just been said it will be noted that the springs 81 are double acting. At times these springs may act at their outer ends to advance their associate balls along the containing slots just after said balls have passed the check balls. At other times when the outer ends of said springs are held from advancing by the check balls and the retarding contrivance is disconnected, the inner ends of said springs may be considered the free ends for it will be these inner ends which will move or turn to permit backward return movements of the gear wheel 78.

From what has been said it will be apparent that the initial relation between the checking devices and the coöperating balls 80 and 80ª will always be such that a substantial free and uninterrupted movement of the carriage will take place after it has been released by the tabulator key prior to the momentary checking or retardation of said carriage by the coöperation of the checking balls and one or another of the balls 80 and 80ª. It will furthermore be apparent that during short runs of the carriage the movement of said carriage will be comparatively free so that a minimum of time will be consumed in such short run and that during longer runs of the carriage there will be one or more momentary retardations occurring intermittently or periodically, the number of such intermittent retardations depending on the length of the run of the carriage.

In the modified construction shown in Fig. 12 the main difference from the preferred construction above described is that the pressure regulating balls 71 are dispensed with and pressure springs 72ª engage directly with the checking balls 70ª. Owing to the proximity of the lower carriage rail 8, however, it is not feasible to provide an individual adjustment for the adjacent spring 72ª, the only adjustment for said spring 72ª being that which it may receive indirectly from the adjustment of the opposite spring 72ª which coöperates with an adjustable abutment or screw plug 72ᵇ. Furthermore, in the modified form it may sometimes happen that initially the check balls 72ª may engage with the web or neck of the gear wheel 77ª between the slots 79ª in said wheel in which case there might be a slight checking of the carriage initially prior to the beginning of the initial free run thereof. Such checking if it occurs would, of course, be slight and would depend for its degree on the tension of the spring 72ª. Because of the superiority in these respects of the first described form, however, said first described form is the preferred one.

By my present invention it will be noted that I combine means for intermittently decreasing the speed of the carriage during a run thereof with a lost motion mechanical connection between said means and the carriage; that the relationship to the carriage of the intermittent retarding means is such that the carriage, after being connected with said means and released, always moves freely a plurality of letter space distances prior to the beginning of the retarding action and after such retarding action the carriage is movable a plurality of letter space distances prior to the beginning of the next succeeding retarding action of said means; that said intermittent retarding means comprises co-acting devices, one of which (either of the balls 80 or 80ª in the present case) has a yielding connection with the carriage and is movable intermittently by the carriage during its run, or, in other words, said device, because of its yielding connection, will be temporarily arrested each time it is brought into coöperation with a co-acting device or devices, (in the present instance, the check balls 70); that said co-acting device or devices are yieldingly mounted on a relatively stationary part, that is, on a part which is not moved by the carriage during its run; that when the two retarding or checking devices are brought into co-action, one of them yields to the other during the initial stage of the co-action and thereafter during a succeeding stage of the co-action, the other of said devices yields to the first, or in other words, when, for example, the ball 80 is brought into co-action with the check balls 70, said ball 80 first yields and is held from movement until the end of the slot in which it is seated forces it past the check balls 70, which then in turn yield to the ball 80, the latter ball moving into the space normally occupied by said check balls 70.

Various changes besides those specified may be made without departing from my invention.

What I claim as new and desire to secure by Letters Patent, is:—

1. In a typewriting machine, the combination of a carriage, and retarding means adapted to act intermittently during a single run of the carriage, said means comprising co-acting devices, one of said devices having a yielding operative connection with the carriage and being moved at times by the carriage during its run and when not so moved being held against movement during said run of the carriage.

2. In a typewriting machine, the combination of a carriage, and retarding means adapted to act intermittently during a single run of the carriage, said means comprising co-acting devices, one of said devices having a yielding operative connection with the carriage and being movable intermittently by the carriage during its run and the carriage being movable through a plurality of letter space distances between two successive retarding actions of said means.

3. In a typewriting machine, the combination of a carriage, and means for lessening the speed of the carriage intermittently during a run thereof, said means comprising two co-acting devices, and a yielding operative connection between the carriage and one of said devices whereby the latter device is temporarily arrested when brought into co-action with the other of said devices.

4. A retarding contrivance for typewriting machines comprising two co-acting devices one of said devices having a yielding operative connection with the carriage of the machine when the contrivance is brought into operation, and being movable by the carriage into contact with the other co-acting device which is yieldingly mounted on the frame of the machine.

5. In a typewriting machine, the combination of a tabulator stop, a stop coöperative therewith, means including a key for bringing said stops into alinement prior to the release of the carriage, and carriage retarding means comprising two co-acting devices, one of said devices having a yielding operative connection with the carriage and being movable by the carriage into contact with the other co-acting device which is yieldingly mounted on the frame of the machine.

6. A retarding contrivance for typewriting machines comprising two co-acting devices, one of said devices being operatively connected with the carriage and both of said devices being yieldingly mounted, one of said devices yielding during the initial stage of the co-action between said two devices and thereafter causing the other of said devices to yield.

7. A retarding device for typewriting machines comprising two yieldingly mounted checking devices one of which is movable by the carriage into engagement with the other, said devices after such engagement alternately yielding one to the other.

8. In a typewriting machine provided with a retarding contrivance comprising a spring-pressed movable device, and a co-acting device movable by the carriage and yieldingly and operatively connected therewith when the contrivance is in operation, said co-acting device being movable by the carriage into contact with the other device, thereafter yielding to said other device and then moving into the space normally occupied by said other device.

9. In a typewriting machine, the combination of a carriage, a normally inoperative retarding contrivance, key operated means for connecting said contrivance with said carriage, said contrivance comprising a device adapted to turn about a center of motion, and connections including a double acting spring between said rotary device and said carriage.

10. A retarding contrivance adapted to be connected with the carriage of a typewriting machine concurrently with the release of said carriage, said contrivance comprising co-acting checking devices, a carrier for one of said devices connectible with the carriage, and a double-acting spring between said carrier and the checking device on said carrier.

11. In a typewriting machine, a retarding contrivance comprising co-acting checking devices, and connections between one of said devices and the carriage, said connections including a double-acting spring.

12. In a typewriting machine, a retarding contrivance comprising two movable parts and a double acting spring connecting said parts, said spring at one stage of the operation acting to move one of said parts relatively to the other part and at another stage moving said other part relatively to the first part.

13. In a typewriting machine, a retarding contrivance comprising co-acting checking devices, and connections between one of said devices and the carriage, said connections including two parts adapted to turn about centers of motion and a double acting spring connecting said parts, said spring at one stage of the operation turning one of said parts relatively to the other part and at another stage turning said other part relatively to the first part.

14. In a typewriting machine, a retarding contrivance comprising co-acting checking devices, and connections between one of said devices and the carriage, said connections including two parts adapted to turn about centers of motion and a double-acting spring connecting said parts, said spring at one stage of the operation turning one of said parts relatively to the other part and at another stage turning said other part relatively to the first part, said spring at other times maintaining said parts in unvarying relationship with each other and causing them to turn together.

15. A retarding contrivance for typewriting machines comprising a movable check ball and a co-acting relatively stationary check ball.

16. A retarding contrivance for typewriting machines comprising a check ball, a pair of yieldingly mounted coöperating check balls, and means for forcing the first check ball between said pair of check balls.

17. A retarding contrivance for typewriting machines comprising a check ball, a pair of yieldingly mounted coöperating check balls between which a passageway for the first check ball is made, and means for regulating the pressure applied to said yieldingly mounted check balls.

18. In a typewriting machine, the combination of a retarding contrivance comprising a rotary ball carrier, a check ball thereon, a coöperating check ball, and a spring for maintaining said coöperating check ball in the path of the first check ball.

19. In a typewriting machine, the combination of a retarding contrivance comprising a rotary ball carrier, a check ball thereon, a yielding mechanical connection between said check ball and said carrier, a cooperating check ball, and a spring for maintaining said cooperating check ball in the path of the first check ball.

20. In a typewriting machine, a retarding contrivance comprising a rotary ball carrier adapted to be connected with the carriage when the latter is released, said carrier being formed with an arcuate slot, a check ball in said slot, a spring normally maintaining said check ball at one end of the slot, a cooperating check ball, and a spring for pressing said cooperating check ball into the path of the first check ball.

21. In a typewriting machine, a retarding contrivance comprising a rotary ball carrier adapted to be connected with the carriage and being formed with arcuate slots, check balls in said slots, a pair of cooperating check balls, springs for pressing said cooperating check balls into the path of the check balls on the carrier, the latter check balls being adapted to be forced between said pair of cooperating check balls.

22. In a typewriting machine, a retarding contrivance comprising a rotary ball carrier adapted to be connected with the carriage and being formed with arcuate slots, check balls in said slots, a pair of cooperating check balls, springs for pressing said cooperating check balls into the path of the first named check balls, said first named check balls being adapted to be forced between said pair of cooperating check balls, and a pressure-regulating device for controlling the resistance offered by said pair of cooperating check balls.

23. In a typewriting machine, a retarding contrivance comprising a casing pivotally mounted on the frame of the machine and carrying a pinion adapted to mesh with the carriage rack, a gear wheel meshing with said pinion, a second gear wheel meshing with the first gear wheel and formed with arcuate slots, check balls in said slots, springs maintaining each check ball normally at one end of its slot, a pair of cooperating check balls, pressure balls contactive with said check balls on the gear wheel, springs for said pressure balls, limiting stops for said pressure balls, and means for regulating the pressure of said last recited springs, said pressure-regulating means comprising a slidable abutment and a cooperating thumb screw.

24. In a typewriting machine provided with a traveling carriage, and carriage feed devices including a feed rack, and a feed-pinion shaft, the combination of a casing pivotally supported on the frame of the machine, retarding devices in said casing, a toothed wheel outside the casing, connections between said toothed wheel and the retarding devices in the casing, and a key-actuated lifting device loosely embracing the feed pinion shaft and provided with a slot which receives part of said connections outside of said casing, said lifting device operating to swing said casing on its pivot and connect said toothed wheel with said carriage rack.

25. In a typewriting machine provided with a traveling carriage and carriage feed devices including a feed rack, a feed pinion and a feed pinion shaft, the combination of a bracket, a closed casing pivotally supported on said bracket, retarding devices in said casing comprising two intermeshing gear wheels, and a gear wheel shaft carrying one of said gear wheels, a toothed wheel outside the casing secured to said gear wheel shaft, and a key actuated lifting device loosely embracing the feed pinion shaft and formed with a slot which receives said gear wheel shaft, said lifting device operating on said gear wheel shaft to swing said casing on its pivot and connect said toothed wheel with said carriage rack.

Signed at Syracuse, in the county of Onondaga, and State of New York, this 7th day of January A. D. 1909.

HERBERT H. STEELE.

Witnesses:
BESSIE G. KETTELL,
MARIE K. UNDERDOWN.